US007673100B1

(12) United States Patent
Niver et al.

(10) Patent No.: US 7,673,100 B1
(45) Date of Patent: Mar. 2, 2010

(54) METHODS AND SYSTEMS FOR DISTRIBUTED CACHE TAG MANAGEMENT

(75) Inventors: Brett D. Niver, Grafton, MA (US); Steven R. Chalmer, Auburndale, MA (US); Steven T. McClure, Northboro, MA (US)

(73) Assignee: EMC Corporation, Hopkinton, MA (US)

( * ) Notice: Subject to any disclaimer, the term of this patent is extended or adjusted under 35 U.S.C. 154(b) by 736 days.

(21) Appl. No.: 11/482,912

(22) Filed: Jul. 10, 2006

(51) Int. Cl.
*G06F 12/00* (2006.01)
(52) U.S. Cl. ............... 711/119; 711/118; 711/E12.017
(58) Field of Classification Search .............. None
See application file for complete search history.

(56) References Cited

U.S. PATENT DOCUMENTS 6,757,790 B2    6/2004   Chalmer et al.
7,136,963 B2 * 11/2006   Ogawa et al. ............... 711/113

* cited by examiner

*Primary Examiner*—Reginald G Bragdon
*Assistant Examiner*—Thanh D Vo
(74) *Attorney, Agent, or Firm*—Muirhead and Saturnelli, LLC

(57) ABSTRACT

Methods and systems are disclosed that relate to locating cached data corresponding to data in persistent memory within a data storage facility. An exemplary method includes receiving a request for data in persistent memory, applying a function to a persistent memory address of the requested data to determine an address of one of a plurality of cache tag controllers, each of which controls nonduplicative cache tags, and looking up, at the addressed cache tag controller, a cache memory address for data corresponding to the requested data.

18 Claims, 4 Drawing Sheets

METHODS AND SYSTEMS FOR DISTRIBUTED CACHE TAG MANAGEMENT

BACKGROUND

U.S. Pat. No. 6,757,790 to Chalmer et al., which issued on Jun. 29, 2004, disclosed a distributed, scalable data storage facility with cache memory. The '790 patent describes a data storage facility that includes a plurality of data storage devices coupled through multi-path connections to cache memory. In the disclosed facility, a plurality of interfaces to host processors communicate with the cache memory and with cache tag controllers that define cache memory over multiple paths.

Generally, cache memory serves as an intermediate data repository between persistent memory and host systems. Cache memory can reduce the time a data storage facility requires to complete a data read or write operation by returning requested data or by receiving data being sent to the data storage facility.

Each cache memory entry can have a tag, which specifies the identity of the associated data in persistent memory. When the cache client (e.g., a CPU, Web browser, operating system) wishes to access data in persistent memory, it first checks the cache. If an entry can be found with a tag matching that of the desired data, the cache memory data associated with the entry is used instead of the data in persistent memory. This situation is known as a cache hit. The alternative situation, i.e., when the cache is consulted and found not to contain data with the desired tag, is known as a cache miss. The data fetched from the persistent memory during miss handling can be inserted into the cache, ready for the next access.

The '790 patent discloses two cache tag controller nodes interconnected by a high-speed bus and operating in parallel. Each cache tag controller contains an entry for each cache memory location in the data storage facility. The cache tag controller nodes in the '790 patent are redundant and coherent. Data coherency assures the data at different locations is synchronized at least temporarily to improve reliability. When a I/O node in a data storage facility such as disclosed in the '790 patent receives a request for data, it first checks one of the redundant cache tag controllers to determine if that data has been cached.

With respect to the present invention, the inventors recognized that the need to synchronize redundant cache tag controllers containing an entry for each cache memory location in a data storage facility may result in bottlenecks in the data storage facility. Therefore, there is a need for improved method or system for managing and accessing cached data.

SUMMARY

Methods and systems are disclosed that use a plurality of cache tag controllers to locate information in a data storage facility. Each cache tag controller stores cache location information and other data useful in identifying cache data in one or more nodes. No single cache tag controller includes all of the cache tag information for the data storage facility. The use of a plurality of cache tag controllers, each controlling nonduplicative cache tags, distributes the load that would exist for a single comprehensive cache tag controller. Moreover, division of cache tag entries among a plurality of cache tag controllers eliminates the need to synchronize the cache tags in each cache tag controller. Even when the data storage facility includes redundant cache tag controllers, less information needs to be synchronized if no single cache tag controller includes all of the cache tag information for the data storage facility. Thus, disclosed methods and systems can improve the performance of the data storage facility.

One embodiment of the invention is a method for locating cached data corresponding to data in persistent memory within a data storage facility. The method includes receiving a request for data in persistent memory. The method further includes applying a function to a persistent memory address of the requested data to determine an address of one of a plurality of cache tag controllers, each of which controls nonduplicative cache tags, and looking up, at the addressed cache tag controller, a cache memory address for data corresponding to the requested data.

Another embodiment of the invention is a system for locating cached data corresponding to data in persistent memory within a data storage facility. The system includes a processor and a memory. The processor and the memory are configured to perform a method that comprises receiving a request for data in persistent memory, applying a function to a persistent memory address of the requested data to determine an address of one of a plurality of cache tag controllers, each of which controls nonduplicative cache tags, and looking up, at the addressed cache tag controller, a cache memory address for data corresponding to the requested data.

Additional embodiments consistent with principles of the invention are set forth in the detailed description that follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to illustrative embodiments of the invention, examples of which are shown in the accompanying drawings.

Figure 1A:
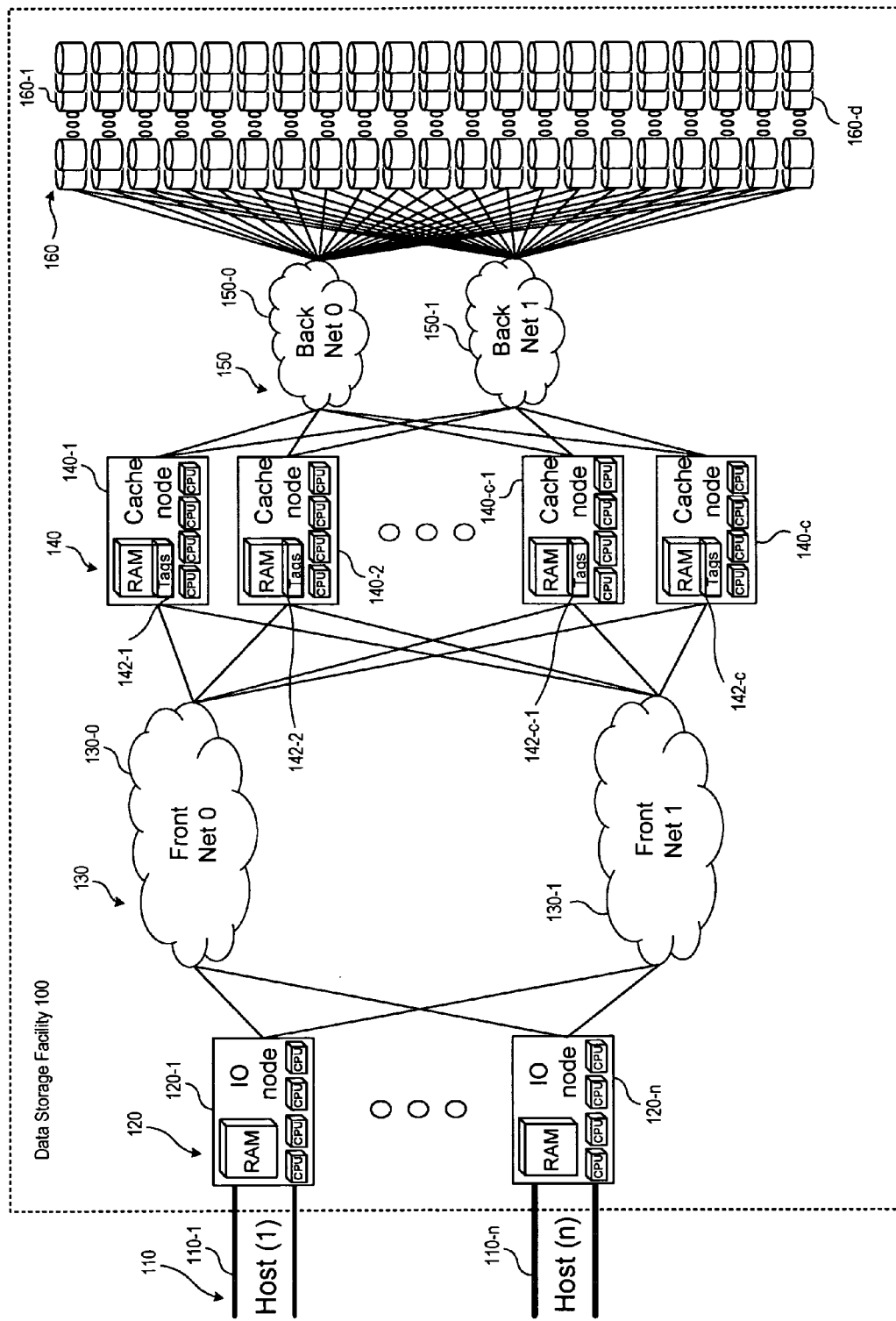
FIG. 1A illustrates a data storage facility, consistent with features and principles of the present invention.

FIG. 1A depicts a distributed data storage facility 100, consistent with features and principles of the present invention. Facility 100 of FIG. 1A features a three-level architecture including a plurality of I/O Nodes 120-1, . . . , 120-n; a plurality of Cache Nodes 140-1, . . . , 140-c; and a plurality of persistent memory storage devices 160-1, . . . , 160-d. A Front Network 130 enables communication between the plurality of I/O Nodes 120-1, . . . , 120-n and the plurality of Cache Nodes 140-1, . . . , 140-c. A Back Network 150 enables communication between the plurality of Cache Nodes 140-1, . . . , 140-c and the plurality of persistent memory storage devices 160-1, . . . , 160-d. The plurality of persistent memory storage devices 160-1, . . . , 160-d form an array of persistent memory storage devices 160.

In operation, facility 100 communicates with a plurality of hosts 110-1, ..., 110-n. Each host 110 has the capability of issuing data requests to an I/O Node 120 in a known syntax. In the below description, such requests are called host requests. Generally, a host requests includes an operation code. The operation code may define a specific operation. Two such operations are a host read operation and a host write operation. As used herein, "host read request" is meant to designate an I/O request that initiates a host read operation for data from a location in the data storage facility 100, and a "host write request" is meant to designate an I/O request that initiates a host write operation for data to be transferred to the data storage facility 100.

In accordance with present invention, I/O node 120 can identify a persistent memory address in facility 100 for the data identified in a host request. For example, the host request can include a virtual location for specific data. In this example, the host request address may identify a logical volume, an initial address in that logical volume, and, for requests that define blocks of different sizes, a block size parameter. In this example, I/O node 120 can translate the virtual location into an address in the array of persistent memory storage devices 160. A host may also request a named volume as a representation of an entry in a file system. The I/O node can translate this, first using directory look-up techniques well-known in the art, and then translating the logical volume data returned from the directory look-up into the address in the persistent memory storage devices.

Each persistent memory storage device in FIG. 1A features non-volatile memory. Persistent memory storage devices include, for example, magnetic disk drives, or even a set or sets of magnetic disk drives. Data storage facility 100 include persistent memory storage devices controlled by standard building blocks and interconnected by multipath switched interconnection systems. The standard building blocks, formed from hardware nodes, define a network-like configuration with uniquely identified hardware nodes at different positions within the network. As will become evident, the multipath switching systems provide parallel communications paths between these hardware nodes and the persistent memory storage devices.

An array of persistent memory storage devices 160 may occupy a single or common address space. A persistent memory address identifies a unique data storage location in one of the plurality of persistent memory storage devices 160-1, ..., 160-d. Each of the plurality of persistent memory storage devices 160-1, ..., 160-d includes a controller for responding to a transmission of an address and control information from one of the cache nodes 140 either by transferring data from a persistent memory storage device 160 to a requesting cache node 140, in the case of a read operation, or by transferring data from a cache node 140 to a persistent memory storage device 160, in the case of a write operation. The controller may transfer data from more than one device 160 or node 140 in response to a transmission.

The data storage facility 100 of FIG. 1A includes a plurality of I/O nodes 120-1, ..., 120-n that communicate with the plurality of hosts 110-1, ..., 110-n. FIG. 1A depicts representative I/O nodes 120-1, ..., 120-n, where "n" represents a maximum number of I/O nodes. The first bidirectional interface at each I/O node, such as the first bidirectional interface 230 (cf. FIG. 2), connects to a host and may act as a port. FIG. 1A depicts a configuration where each I/O node 120 has two paths to communicate with facility 100. Bidirectional communications through an I/O node include a host request sent to the I/O node and a host return sent by the I/O node to the host signaling the outcome of the host request. The second bidirectional interface in each I/O node, corresponding to the second bidirectional interface 240 in FIG. 2, enables communications with different multipath connections.

Front Network 130 in FIG. 1A includes two discrete networks 130-0, 130-1. Front Network 130-0 in FIG. 1A provides a first path between each of the plurality of I/O Nodes 120-1, ..., 120-n and each of the plurality of Cache Nodes 140-1, ..., 140-c. Front Network 130-1 in FIG. 1A provides a second path between each of the plurality of I/O Nodes 120-1, ..., 120-n and each of the plurality of Cache Nodes 140-1, ..., 140-c. In this embodiment, each first bidirectional interface in the cache nodes 140, such as the first bidirectional interface 230 in FIG. 2, connects to a node in the connections 130-0 and 130-1. In this embodiment, each first bidirectional interface in the cache nodes 140, such as the first bidirectional interface 230 in FIG. 2, connects to a node in the connections 130-0 and 130-1.

Figure 1B:
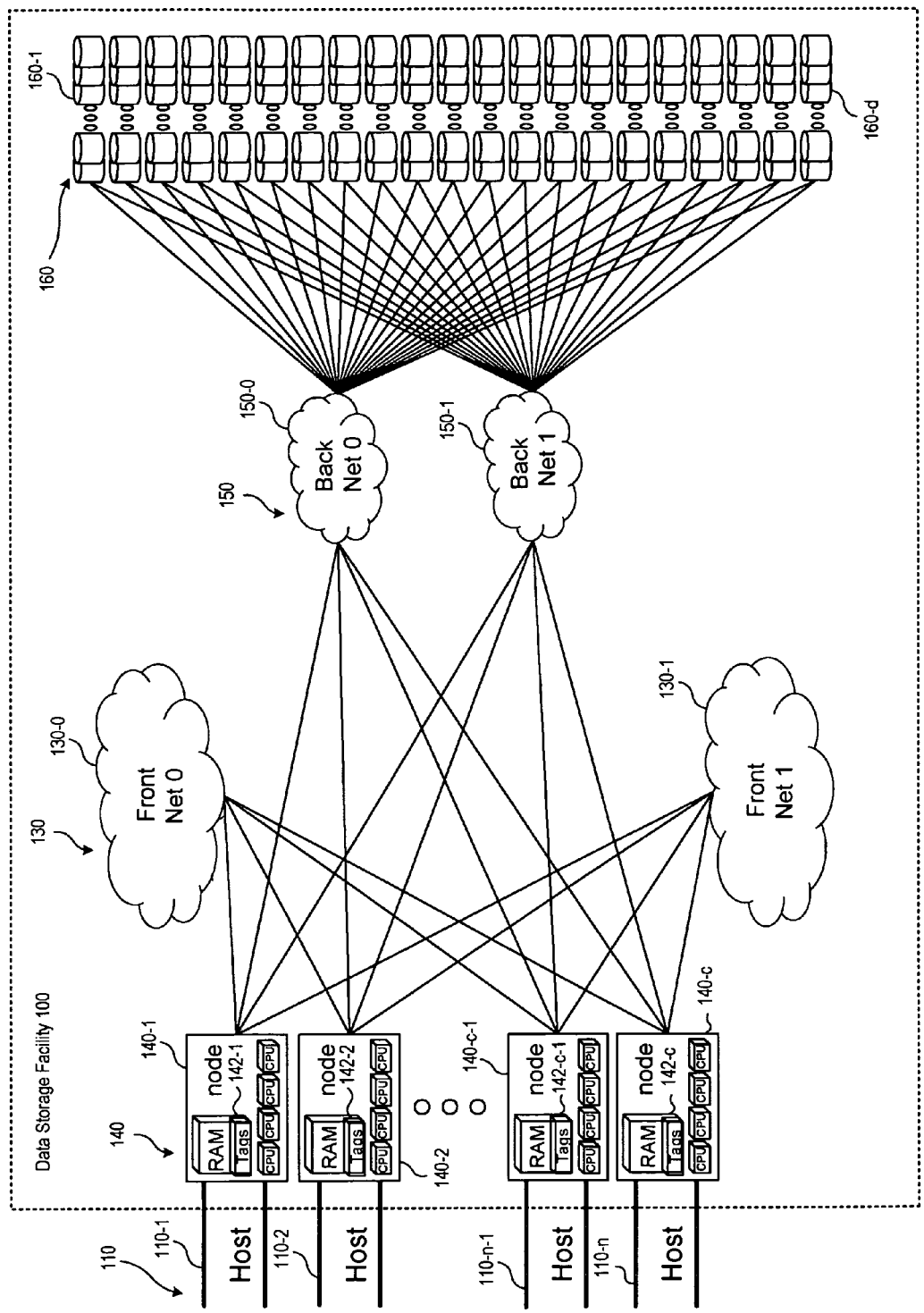
FIG. 1B illustrates another data storage facility, consistent with features and principles of the present invention.

Back Network 150 in FIG. 1A includes two discrete networks 150-0, 150-1. Back Network 150-0 in FIG. 1B provides a first path between each of the plurality of Nodes 140-1, ..., 140-c and each of the plurality of persistent memory storage devices 160-1, ..., 160-d. Back Network 150-1 in FIG. 1A provides a second path between each of the plurality of Nodes 140-1, ..., 140-c and each of the plurality of persistent memory storage devices 160-1, ..., 160-d. The plurality of persistent memory storage devices 160-1, ..., 160-d form an array of data storage locations 160. Bidirectional interfaces, such as the second bidirectional interface 240 in FIG. 2, in the cache nodes 140 attach to the second connections 150-0 and 150-1.

Each of the connections 130-0, 130-1, 150-0, and 150-1 can take one of many forms. For example, the connections 130-0 and 130-1 may comprise switched fabrics for providing redundant, high-bandwidth communication paths between the cache nodes 140 and the data storage locations 160. The connections 150-0 and 150-1 may also comprise switched fabrics or conventional networks. The specific implementation may depend upon the relative physical locations of the various hardware nodes and bandwidth requirements for achieving satisfactory performance.

Each Cache Node 140 in FIG. 1A includes a cache tag controller 142. Accordingly, facility 100 in FIG. 1B includes a plurality of cache tag controllers 142-1, ..., 142-c, which are located within a respective one of the plurality of Cache Nodes 140-1, ..., 140-c. An entry, or cache tag, in one of the cache tag controllers 142 directly corresponds to a cache memory address in one of the cache nodes 140. Nonetheless, entries in the cache tag controller 142-1 of cache node 140-1 need not correspond to a cache memory address in cache node 140-1. Instead, one or more entries in the cache tag controller 142-1 of cache node 140-1 may correspond to a cache memory address in a different cache node, such as cache node 140-2. Like other cache tag controllers, cache tag controller 142-1 of cache node 140-1 may only include entries corresponding to cache memory addresses in other cache nodes—not cache node 140-1.

The cache tag controllers 142-1, ..., 142-c can operate under a four-state model that includes: (1) an invalid state, (2) a nonexistent state, (3) an exclusive state, and (4) a modified-shared state. An invalid state exists when the I/O node 120 seeks to access the cache node 140 and finds that there is no entry in the cache tag controller, or when there is an entry in the cache tag controller but that entry is locked. In the former case, the tag entry transitions from the nonexistent state to the invalid state. In the latter case, the tag entry remains in the invalid state.

A nonexistent state exists if the requested cache tag does not exist. When this occurs, there is no corresponding cache node entry, called a "cache line" in the following discussion. That is, when the cache tag controller 142 converts the 54-bit address to the common address space to a cache tag address, the cache line does not exist anywhere in the cache nodes 140 unless the 54-bit address in a request message matches the address in the cache tag stored as an entry in the cache tag controller 142. A nonexistent state exists at the time of a first-ever request for access to a particular location. It also can exist because the total number of cache lines is a fraction of the total number of data storage locations 160. At times, any given cache tag may be assigned to any of a plurality of data storage locations that are different from the specified data storage locations 160.

A modified-shared state exists when two cache nodes contain the same data based upon a single cache line. When the data exists in only one cache node and matches the data in the corresponding data storage location 160, the cache line is in its exclusive state.

Consistent with features and principles of the present invention, no single cache tag controller 142 includes all of the cache tag information for the plurality of Cache Nodes 140-1, ..., 140-c in FIG. 1A. Thus, I/O node 120 must identify the cache tag controller 142 that would include the cache tag information for the cached data corresponding to the data identified in a host request. Accordingly, in embodiments of the invention, I/O node 120 applies a function to the persistent memory address of the requested data to determine an address of the cache tag controller 142 that would include that cache tag information. In one embodiment for example, a modulo N function is performed on the persistent memory address of the requested data, where N is the number of cache tag controllers present in the system. In another example, a mask-and-shift operation is performed on the persistent memory address and the result is used as the index into a look-up-table of which cache tag controller to use. In yet another example, a hash function is applied to the persistent memory address to derive the index used with the look-up-table.

A variety of techniques for looking up a cache tag entry in the appropriate cache tag controller 142 may then be used. One such technique is disclosed in U.S. Pat. No. 6,757,790 to Chalmer et al., which is hereby incorporated by reference. In an alternative technique, the persistent memory address of the requested data is used to directly index the cache tag entry. Thereafter, the I/O node 120 learns which cache node 140, if any, includes the requested data. The I/O node 120 additionally learns the cache memory address of the requested data, if the requested data exists in cache. The I/O node 120 can thus access the requested data at its cache memory address. If the requested data does not exist in cache, a copy may be created in cache and the cache memory address of the requested data would then be available at the appropriate cache tag controller 142.

FIG. 1B depicts an alternative distributed data storage facility 100, consistent with features and principles of the present invention. Facility 100 of FIG. 1B features a two-level architecture including a plurality of Nodes 140-1, ..., 140-c; and a plurality of persistent memory storage devices 160-1, ..., 160-d. A Front Network 130 enables communication between the plurality of Nodes 140-1, ..., 140-c. A Back Network 150 enables communication between the plurality of Nodes 140-1, ..., 140-c and the plurality of persistent memory storage devices 160-1, ..., 160-d.

The plurality of Nodes 140-1, ..., 140-c in FIG. 1B communicate with the plurality of hosts 110-1, ..., 110-n.

Again, the first bidirectional interface at each node 140, such as the first bidirectional interface 230 (cf. FIG. 2), connects to a host and acts as a port. FIG. 1B depicts a configuration where each of the cache nodes 140 includes two such interfaces or ports. Bidirectional communications through a node include a host request sent to the node and a host return sent by the node to the host signaling the outcome of the host request. The second bidirectional interface in each node, corresponding to the second bidirectional interface 240 in FIG. 2, enables communications with different multipath connections.

Front Network 130 in FIG. 1B includes two discrete networks 130-0, 130-1. Front Network 130-0 provides a first path between each of the Nodes 140-1, ..., 140-c in FIG. 1B. Front Network 130-1 provides a second path between each of the Nodes 140-1, ..., 140-c in FIG. 1B. In this embodiment, each first bidirectional interface in the cache nodes 140, such as the first bidirectional interface 230 in FIG. 2, connects to a node in the connections 130-0 and 130-1.

Back Network 150 in FIG. 1B includes two discrete networks 150-0, 150-1. Back Network 150-0 in FIG. 1B provides a first path between each of the plurality of Nodes 140-1, ..., 140-c and each of the plurality of persistent memory storage devices 160-1, ..., 160-d. Back Network 150-1 in FIG. 1B provides a second path between each of the plurality of Nodes 140-1, ..., 140-c and each of the plurality of persistent memory storage devices 160-1, ..., 160-d. Bidirectional interfaces, such as the second bidirectional interface 240 in FIG. 2, in the cache nodes 140 attach to the second connections 150-0 and 150-1. Devices 160 in FIG. 1B are similar to those described with respect to FIG. 1A.

Each node 140 in FIG. 1B includes a cache tag controller 142. Accordingly, facility 100 in FIG. 1B includes a plurality of cache tag controllers 142-1, ..., 142-c, which are located within a respective one the plurality of Nodes 140-1, ..., 140-c. An entry, or cache tag, in one of the cache tag controllers 142 directly corresponds to a cache memory address in one of the nodes 140. Nonetheless, entries in the cache tag controller 142-1 of node 140-1 need not correspond to a cache memory address in node 140-1. Instead, one or more entries in the cache tag controller 142-1 of node 140-1 may correspond to a cache memory address in a different cache node, such as cache node 140-2. Like other cache tag controllers, cache tag controller 142-1 of cache node 140-1 may only include entries corresponding to cache memory addresses in other cache nodes—not cache node 140-1.

Consistent with features and principles of the present invention, no single cache tag controller 142 includes all of the cache tag information for the plurality of Nodes 140-1, ..., 140-c in FIG. 1B. Thus, a node 140 must identify the cache tag controller 142 that would include the cache tag information for the cached data corresponding to the data identified in a host request. Accordingly, node 140 applies a function to the persistent memory address of the requested data to determine a address of the cache tag controller 142 that would include that cache tag information. In one embodiment for example, a module two function is performed on the persistent memory address of the requested data. Node 140 then requests the cache tag information from the appropriate cache tag controller 142. In one embodiment, the result of the function is the address of the appropriate cache tag controller 142. In an alternative embodiment, the result of the function is used to look up the address of the appropriate cache tag controller 142.

A variety of techniques for looking up a cache tag entry in the appropriate cache tag controller 142 may then be used. Thereafter, the requesting node 140 learns which node 140, if any, includes the requested data. The requesting node 140 additionally learns the cache memory address of the requested data, if the requested data exists in cache. The requesting node 140 can thus access the requested data at its cache memory address. If the requested data does not exist in cache, a copy may be created in cache and the cache memory address of the requested data would then be available at the appropriate cache tag controller 142.

Figure 2:
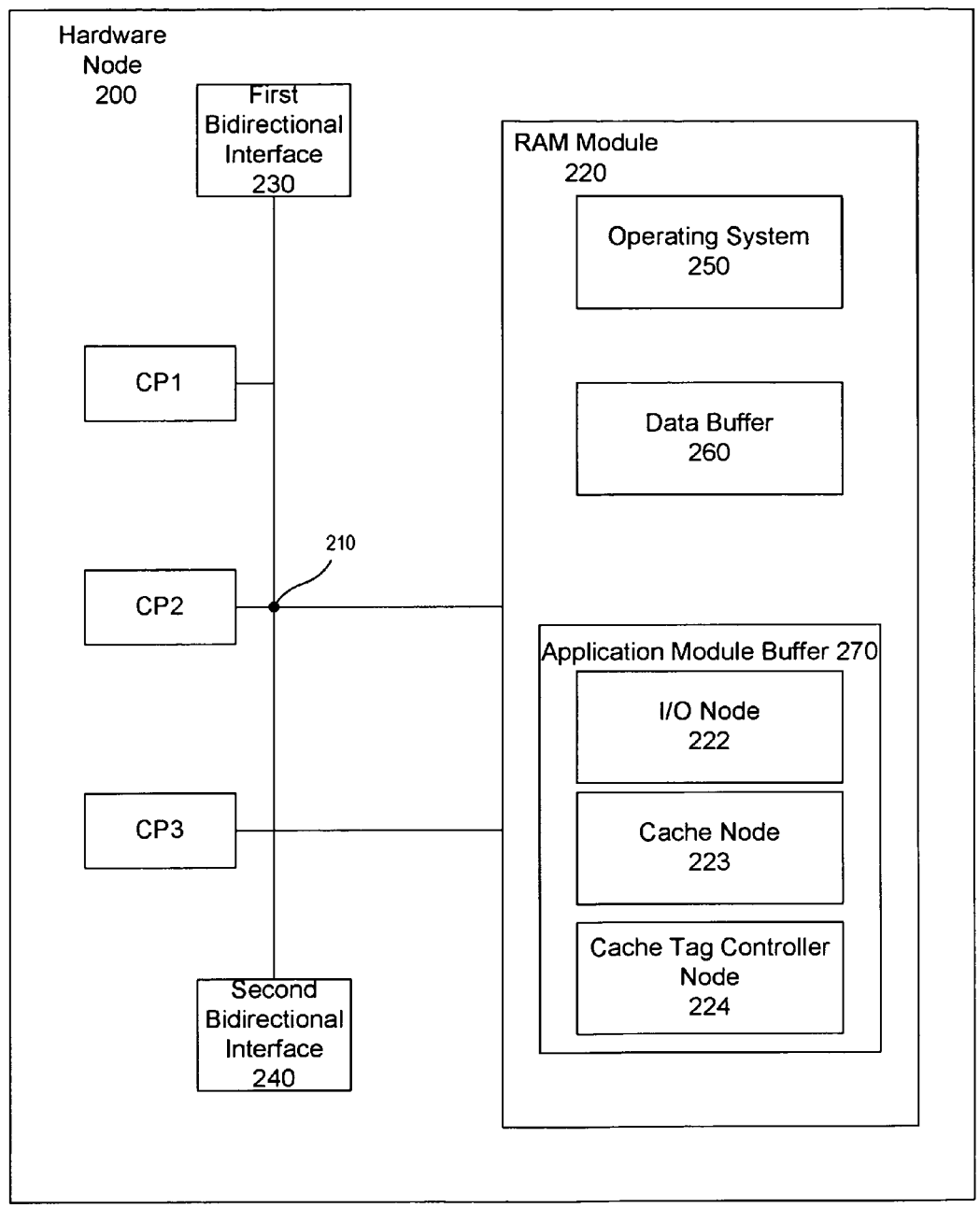
FIG. 2 illustrates an exemplary node, consistent with features and principles of the present invention.

FIG. 2 depicts one embodiment of a typical hardware node 200 with multiple processors in the form of CP1, CP2, and CP3 processors attached to a parallel internal communications path or bus 210. Bus 210, which may have any one of a variety of architectures, enables communications among the processors, such as the processors CP1 through CP3, a random access memory module 220, a first bidirectional interface 230, and a second bidirectional interface 240. Bidirectional interfaces 230 and 240 provide external communications paths between bus 210 and other external paths. Each bidirectional interface may have a form that will depend upon the specific implementation of the invention and the function assigned to the hardware node 200. In this embodiment, the random access memory module 220 contains an operating system 250, an application module buffer 270, and a data buffer 260. The construction of hardware nodes such as node 200, and the use of random access memory for operating systems and for serving as data buffers, are known in the art, and such hardware nodes are commercially available.

In FIG. 2, random access memory module 220 can store one or more application modules 222, 223, and 224 in application module buffer 270. When an I/O node application module 222 is present in the application module buffer 270 and active, the hardware node 200 acts as an I/O node communicating with one or more hosts. When node 200 acts as an I/O node, data buffer 260 stores configuration information about the persistent memory storage devices 160 such as shown in FIGS. 1A and 1B. When node 200 acts as an I/O node, control logic controls the node's communications with a host, particularly in response to host read and write requests. This control logic can be implemented in hardware, firmware, and/or software. This control logic can use the configuration information in the data buffer 260 to convert a host request address to one or more addresses in an array of persistent memory storage devices 160. The control logic also enables communications with other hardware node 200.

When cache node application module 223 is present in the application module buffer 270 and active, hardware node 200 acts as a cache node. When node 200 acts as a cache node, data buffer 260 contains cached data corresponding to data in the array of persistent memory storage devices 160 which can be located with one of a plurality of cache tag controllers. When node 200 acts as a cache node, cache node control logic establishes communications with other hardware nodes by means of request and response messages. When node 200 acts as a cache node, cache node control logic in node 200 is capable of effecting transfers to and from the array of persistent memory storage devices 160 in response to I/O node request messages. When node 200 acts an I/O node and/or as a cache node, it handles data specified in a host request.

When cache tag controller node application module 224 is present in the application module buffer 270 and active, hardware node 200 acts as a cache tag controller 142. When node 200 acts as a cache tag controller, data buffer 260 stores cache status and other data useful in identifying the data in the cache nodes. Control logic in cache tag controller node application module 224 enables responses to request messages from I/O nodes and cache nodes, and the generation of response messages reflecting actions taken in response to a request message.

Figure 3:
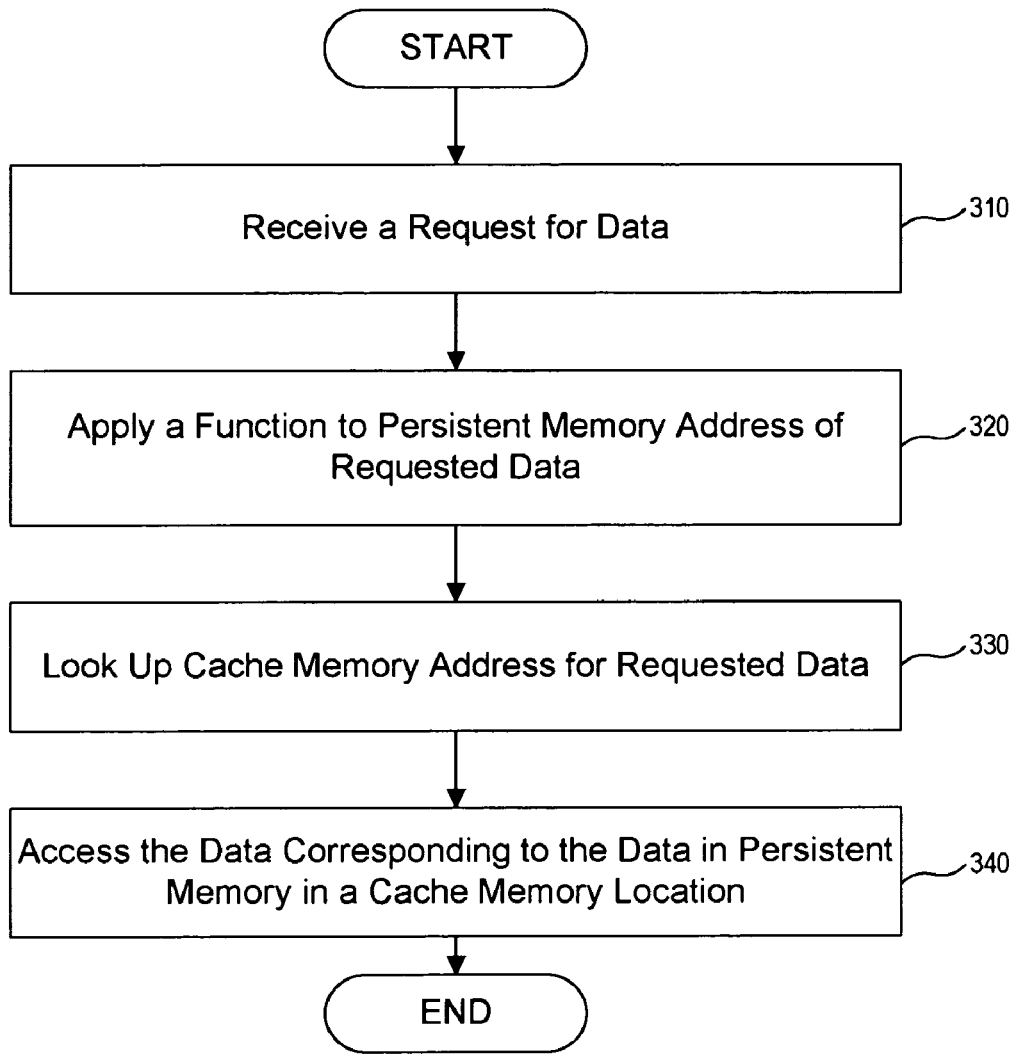
FIG. 3 illustrates a flow chart of an exemplary method for locating cached data, consistent with features and principles of the present invention.

FIG. 3 illustrates a flow chart of an exemplary method for locating cached data, which can be implemented by facility 100 of FIG. 1A or FIG. 1B consistent with the present invention. In operation, host 110 in FIG. 1A communicates a data request to I/O node 120. In stage 310, one of the I/O nodes 120 receives the request for data. The receiving I/O node 120 identifies a persistent memory address of the requested data. In embodiments of the invention, the receiving I/O node converts an address included in the request from the host. In stage 320, the receiving I/O node 120 in FIG. 1A applies a function to the persistent memory address of the requested data to determine the address of a cache tag controller 142 that stores the cache tag for cache memory corresponding to the requested data. One such way to determine the address of one of the cache tag controllers 142 is by applying a modulo two function to the persistent memory address of the request data. I/O node 120 then requests the cache memory address from the appropriate cache tag controller 142. The appropriate cache tag controller 142 can be in any cache node 140. In stage 330, facility 100 looks up the cache memory address of the requested data in the appropriate cache tag controller 142. The appropriate cache tag controller 142 returns the cache memory address of the requested data to the requesting I/O node 120. The cache memory address can be in the cache node 140 including the appropriate cache tag controller 142 or any other cache node 140. Thus, in stage 340, the requesting I/O node 120 may then access the data, corresponding to the requested data in persistent memory, at is cache memory address in cache node 140.

In operation, host 110 in FIG. 1B similarly communicates a data request to node 140. In stage 310, one of the nodes 140 in FIG. 1B receives the request for data. The receiving node 140 identifies a persistent memory address of the requested data. In embodiments of the invention, the receiving I/O node converts an address included in the request from the host. In stage 320, the receiving node 140 in FIG. 1B applies a function to the persistent memory address of the requested data to determine the address of a cache tag controller 142 that stores the cache tag for cache memory corresponding to the requested data. One such way to determine the address of one of the cache tag controllers 142 is by applying a modulo two function to the persistent memory address of the request data. Node 140 then requests the cache memory address from the appropriate cache tag controller 142. The appropriate cache tag controller 142 can be in the requesting node 140 or any other node 140. In stage 330, facility 100 looks up the cache memory address of the requested data in the appropriate cache tag controller 142. The appropriate cache tag controller 142 returns the cache memory address of the requested data to the requesting node 140. The cache memory address can be in requesting node 140 or any other node 140. Thus, in stage 340, the requesting node 140 may then access the data, corresponding to the requested data in persistent memory, at is cache memory address in cache node 140.

There are a variety of approaches for identifying the location of a cache tag entry in a cache tag controller 142. For example, the twenty-nine lower bits of an address can be hash-encoded to obtain an index for directly looking up a cache tag entry list in a table. After obtaining the list, the cache tag controller can determine which of the list entries is the correct tag. In another example, the tag entries are kept sorted in a tree-structure well-known in the art, and a mask-and-shift operation on the address can yield a search target for the tree traversal to find the resultant tag entry.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for locating cached data corresponding to data in persistent memory within a data storage facility, comprising:
    receiving a request for data in persistent memory;
    applying a function to a persistent memory address of the requested data to determine an address of one of a plurality of cache tag controllers, each of which controls nonduplicative cache tags; and
    looking up, at the addressed cache tag controller, a cache memory address for data corresponding to the requested data, wherein at least some of the cache tag controllers contain cache tags for less than all of the cache memory.

2. The method of claim 1, wherein the function is a modulo two function.

3. The method of claim 1, wherein the result of applying the function corresponds to the address of one of the plurality of cache tag controllers.

4. The method of claim 3, further comprising:
    using the result of the function to look up the address of one of the plurality of cache tag controllers.

5. The method of claim 1, further comprising:
    accessing the data, corresponding to the requested data, at the cache memory address.

6. The method of claim 1, further comprising:
    identifying the persistent memory address of the requested data.

7. The method of claim 1, further comprising:
    looking up, at the addressed cache tag controller, the cache memory address for the data corresponding to the requested data by the persistent memory address.

8. The method of claim 1, further comprising:
    wherein, no cache memory address is specified for data corresponding to the requested data at the addressed cache tag controller, copying the requested data into cache memory.

9. The method of claim 1, further comprising:
    receiving a first request for data in persistent memory;
    applying a function to a persistent memory address of the first requested data to determine an address of one of a plurality of cache tag controllers; and
    looking up, at a first addressed cache tag controller, a first cache memory address for data corresponding to the first requested data;
    receiving a second request for data in persistent memory;
    applying a function to a persistent memory address of the second requested data to determine an address of one of a plurality of cache tag controllers, wherein the second requested data differs from the first requested data, wherein the first addressed cache tag controller controls different cache tags than the second addressed cache tag controller; and
    looking up, at a second addressed cache tag controller, a second cache memory address for data corresponding to the second requested data.

10. A system for locating cached data corresponding to data in persistent memory within a data storage facility, the system comprising:
    a processor;
    a memory that includes a cache memory and includes a plurality of cache tag controllers, each of which contains non-duplicative cache tags; and
    a computer-readable storage medium containing execute code that receives a request for data in persistent memory, applies a function to a persistent memory address of the requested data to determine an address of one of a plurality of cache tag controllers and looks up, at the addressed cache tag controller, a cache memory address for data corresponding to the requested data, wherein at least some of the cache tag controllers contain cache tags for less than all of the cache memory.

11. The system of claim 10, wherein the function is a modulo two function.

12. The system of claim 10, wherein the result of applying the function corresponds to the address of one of the plurality of cache tag controllers.

13. The system of claim 12, further comprising:
    using the result of the function to look up the address of one of the plurality of cache tag controllers.

14. The system of claim 10, further comprising:
    accessing the data, corresponding to the requested data, at the cache memory address.

15. The system of claim 10, further comprising:
    identifying the persistent memory address of the requested data.

16. The system of claim 10, further comprising:
    looking up, at the addressed cache tag controller, the cache memory address for the data corresponding to the requested data by the persistent memory address.

17. The system of claim 10, further comprising:
    wherein, no cache memory address is specified for data corresponding to the requested data at the addressed cache tag controller, copying the requested data into cache memory.

18. The system of claim 10, further comprising:
    receiving a first request for data in persistent memory;
    applying a function to a persistent memory address of the first requested data to determine an address of one of a plurality of cache tag controllers; and
    looking up, at a first addressed cache tag controller, a first cache memory address for data corresponding to the first requested data;
    receiving a second request for data in persistent memory;
    applying a function to a persistent memory address of the second requested data to determine an address of one of a plurality of cache tag controllers, wherein the second requested data differs from the first requested data, wherein the first addressed cache tag controller controls different cache tags than the second addressed cache tag controller; and
    looking up, at a second addressed cache tag controller, a second cache memory address for data corresponding to the second requested data.

* * * * *